United States Patent [19]
Shih et al.

[11] Patent Number: 5,609,274
[45] Date of Patent: Mar. 11, 1997

[54] GREASE DISPENSING DEVICE

[75] Inventors: Huan-Yuan Shih, Tao-Yuan; Yung-Feng Chiang, No. 15, Chuang-Ching Tuan, Chung-Feng Rd., Ping-Chen City, Tao-Yuan Hsien, both of Taiwan

[73] Assignee: Yung-Feng Chiang, Tao-Yuan Hsien, Taiwan

[21] Appl. No.: 559,098

[22] Filed: Nov. 16, 1995

[51] Int. Cl.⁶ ............................................. F16W 3/10
[52] U.S. Cl. ...................... 222/262; 184/105.2; 222/333
[58] Field of Search ........................... 222/258, 261–263, 222/333; 184/105.2

[56]  References Cited

U.S. PATENT DOCUMENTS

| | | | |
|---|---|---|---|
| 1,858,155 | 5/1932 | Harris | 222/262 X |
| 1,902,750 | 3/1933 | Barks | 222/262 X |
| 1,956,144 | 4/1934 | Brown | 222/262 X |
| 2,626,085 | 1/1953 | MacKinnon | 222/262 |
| 2,928,574 | 3/1960 | Wagner | 222/262 X |
| 3,987,869 | 10/1976 | Bowers | 184/105.1 |
| 4,257,540 | 3/1981 | Wegmann et al. | 222/262 |
| 5,105,912 | 4/1992 | Heister | 222/262 X |
| 5,404,967 | 4/1995 | Barry | 222/333 X |

FOREIGN PATENT DOCUMENTS

| | | | |
|---|---|---|---|
| 188165 | 1/1957 | Austria | 222/262 |
| 1210199 | 10/1970 | United Kingdom | 184/105.2 |

*Primary Examiner*—Kevin P. Shaver
*Attorney, Agent, or Firm*—Greenblum & Bernstein P.L.C.

[57] ABSTRACT

A grease dispensing device includes a gun body, a push rod member, a driving unit, a linkage unit, and a connecting unit. The gun body has a barrel for receiving grease, and a dispensing tube member with an end portion connected to the barrel. The push rod member is inserted radially and slidably into the end portion of the dispensing tube member in order to push the grease out of the dispensing tube member when the push rod member is moved reciprocally. The driving unit has a rotatable output shaft. The linkage unit interconnects the rotatable output shaft of the driving unit and the push rod member for converting rotary motion of the output shaft into reciprocating motion of the push rod member. The connecting unit connects the driving unit and the gun body.

2 Claims, 4 Drawing Sheets

GREASE DISPENSING DEVICE

BACKGROUND OF THE INVENTION

1. Field of the Invention

This invention relates to a grease dispensing device, more particularly to a grease dispensing device which can dispense grease by means of an electrical driving means in order to reduce manpower and operation time, thereby increasing the operation efficiency of the grease dispensing device.

2. Description of the Related Art

The improvement of the present invention is directed to a conventional grease dispensing device, as shown in FIG. 1. The conventional grease dispensing device comprises a gun body 10 and a pumping means 12. The gun body 10 has a barrel 11 for receiving grease, and a dispensing tube member 111 which has an end portion 121 that is connected to the barrel 11. The pumping means 12 includes a push rod member 121 inserted radially and slidably into the end portion 112 of the dispensing tube member 111, and two lever arms 122, 123 which are connected pivotally to the end portion 112 of the dispensing tube member 111 and the push rod member 121. The grease can be dispensed out of the dispensing tube member 111 by means of manually operating the lever arms 122, 123 to enable the push rod member 121 to move reciprocally in the end portion 112 of the dispensing tube member 111.

While the conventional grease dispensing device apparently achieves its intended purpose, it is time-consuming and labor-consuming to inject grease manually into a large-scale machine which requires many grease injection operations.

SUMMARY OF THE INVENTION

It is therefore a main object of the present invention to provide a grease dispensing device which a be operated in a labor-saving and time-saving manner. According to the present invention, a grease dispensing device comprises a gun body, a push rod member, a driving means, a linkage means, and a connecting means.

The gun body has a barrel for receiving grease, and a dispensing tube member with an end portion connected to the barrel. The push rod member is inserted radially and slidably into the end portion of the dispensing tube member in order to push the grease out of the dispensing tube member when the push rod member is moved reciprocally. The driving means has a rotatable output shaft. The linkage means interconnects the rotatable output shaft of the driving means and the push rod member for converting rotary motion of the output shaft into reciprocating motion of the push rod member. The connecting means connects the driving means and the gun body.

In a preferred embodiment, the linkage means includes a housing, a pair of L-shaped guide rails, a bar member, a driven gear and a speed reduction gear.

The housing has a top wall, front and rear walls which are both connected oppositely to the top wall. The top wall is fixed to and is located under the end portion of the dispensing tube member. The push rod member passes through the top wall.

Each of the L-shaped guide rails has a vertical arm and a horizontal arm which is connected to the internal face of the front wall so that a sliding space is formed between the vertical arm and the internal face of the front wall.

The bar member is connected transversely to a lower end of the push rod member and has a transverse slot formed lengthwise thereof. The bar member is disposed slidably in the sliding spaces formed by the guide rails with the front wall such that an upper end of the push rod member extends into the end portion of the dispensing tube member.

The driven gear is mounted rotatably to the internal face of the rear wall and has an axle which passes through the rear wall and which is connected to the rotatable output shaft of the driving means so that the driven gear can rotate with the rotatable output shaft when the driving means is actuated.

The speed reduction gear is mounted rotatably to the internal face of the rear wall and meshes with the driven gear. The speed reduction gear has an eccentric shaft which extends into the transverse slot of the bar member.

When the driven gear is rotated, the speed reduction gear rotates to enable the eccentric shaft to move reciprocally in the transverse slot of the bar member so that the bar member can move up and down in the sliding spaces, thereby resulting in reciprocating motion of the push rod member.

BRIEF DESCRIPTION OF THE DRAWINGS

Other features and advantages of this invention will become apparent in the following detailed description of a preferred embodiment of this invention with reference to the accompanying drawings, in which.

DETAILED DESCRIPTION OF THE PREFERRED EMBODIMENT

Figure 1:
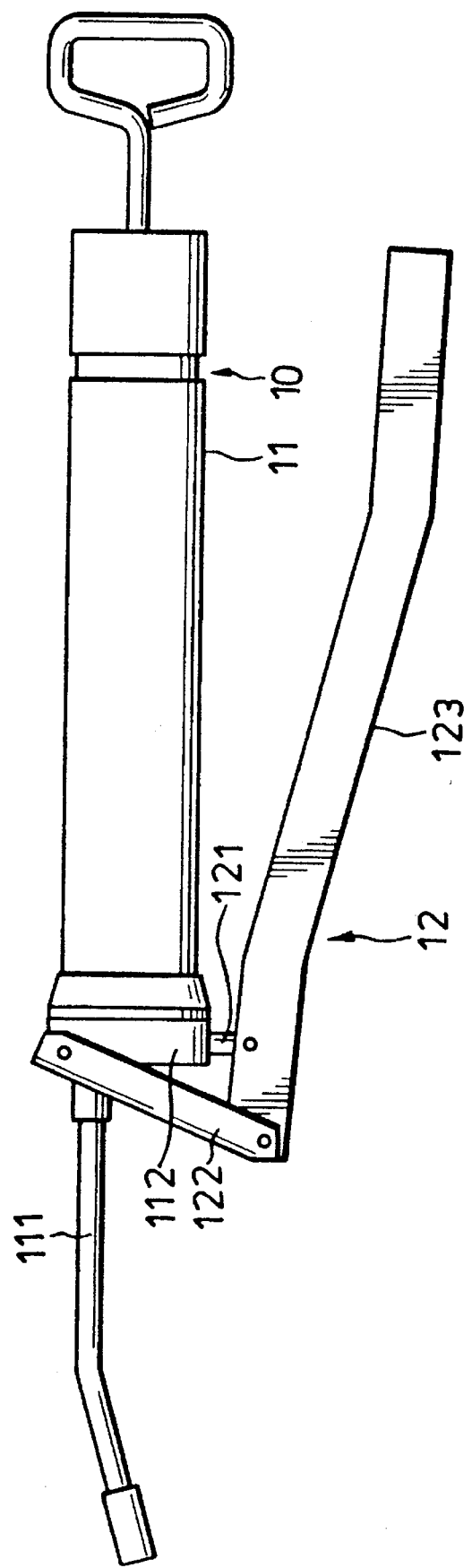
FIG. 1 is a side view of a conventional grease dispensing device.
Figure 2:
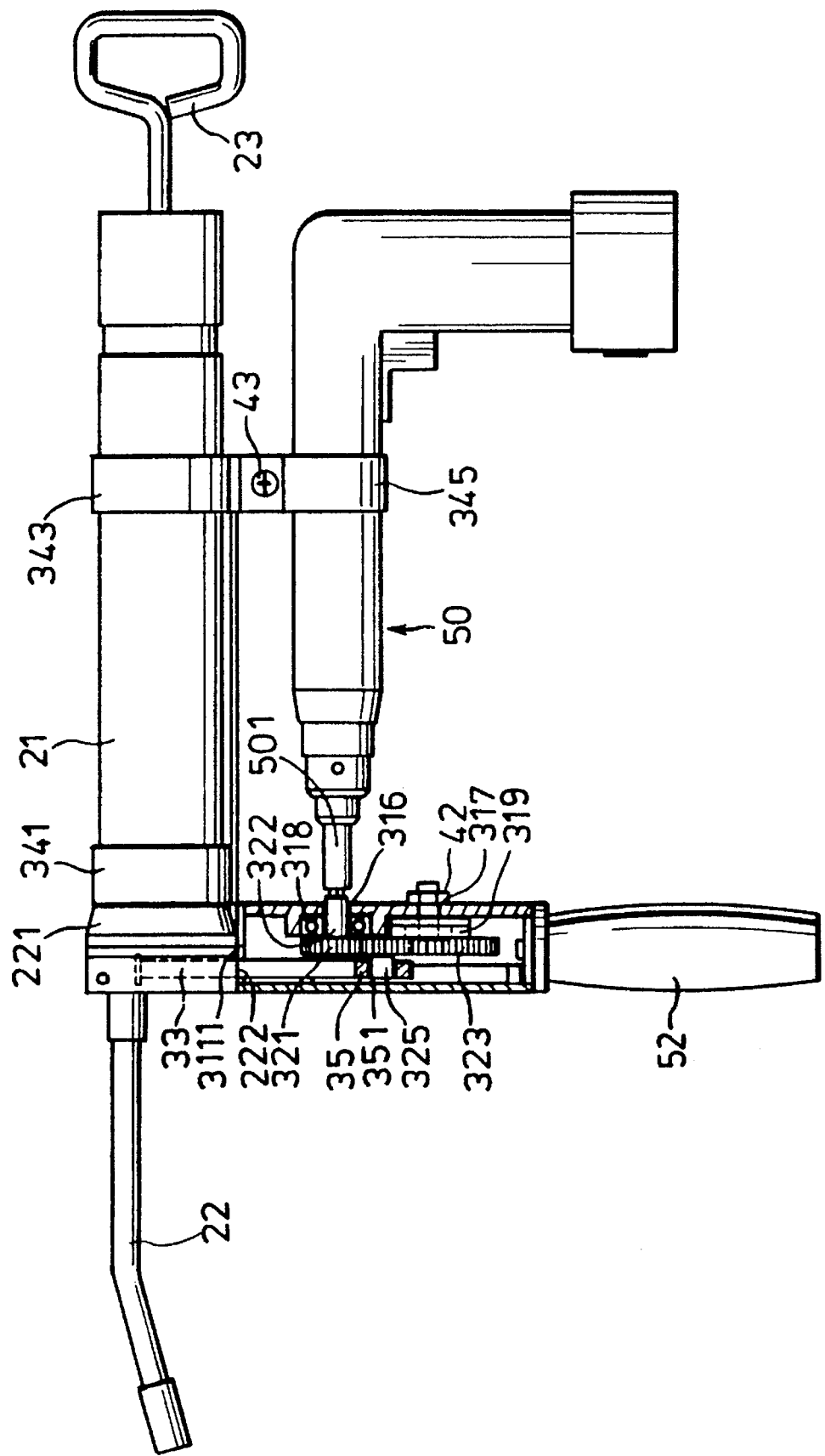
FIG. 2 is a partially sectional view of a preferred embodiment of a grease dispensing device according to the present invention.
Figure 3:
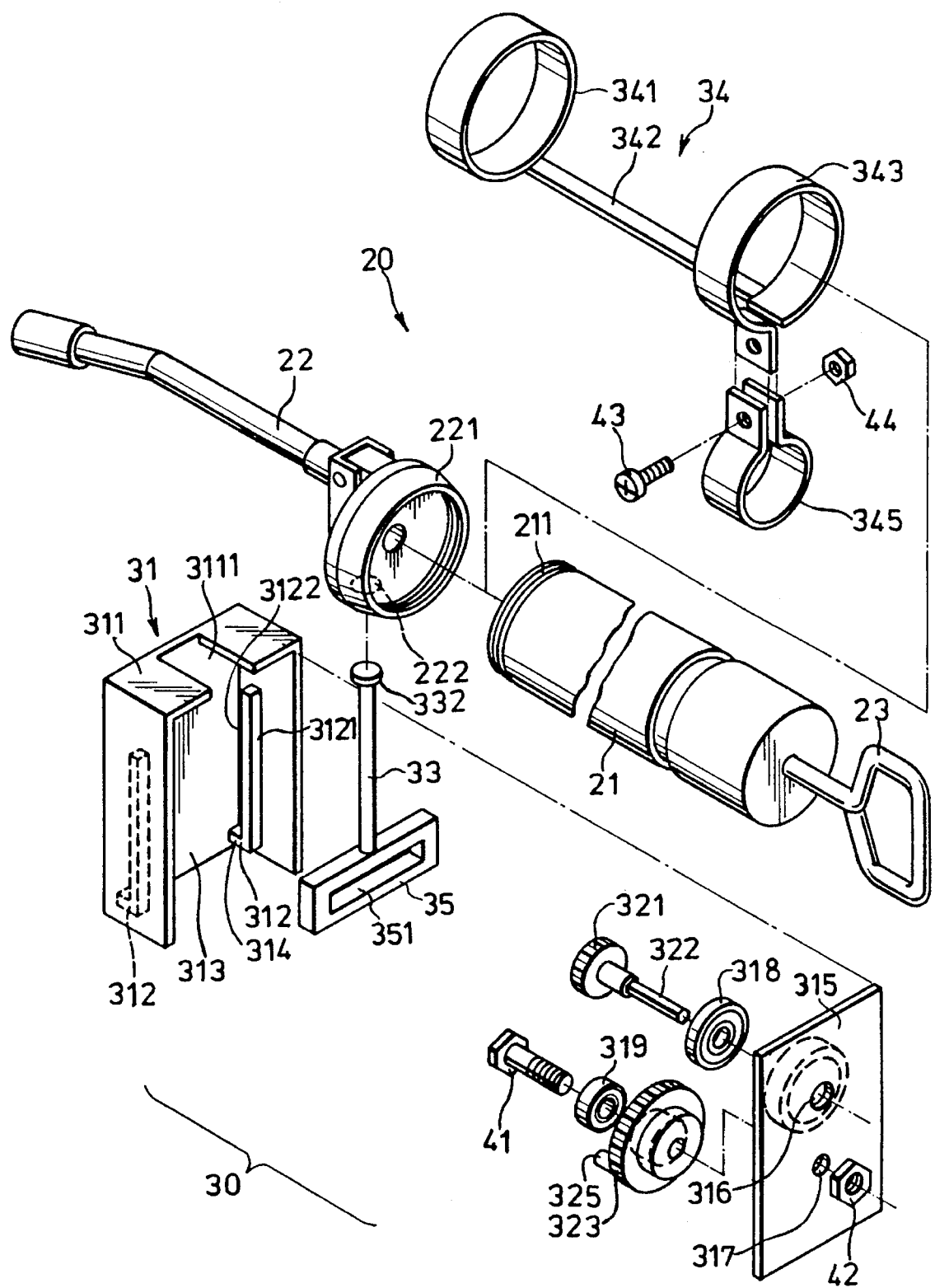
FIG. 3 is an exploded view of the preferred embodiment of the grease dispensing device according to the present invention.

Referring to FIGS. 2 and 3, a preferred embodiment of a grease dispensing device is shown to comprise a gun body 20, a push rod member 33, a driving means 50, a linkage means 30, and a connecting means 34.

The gun body 20 has a barrel 21 for receiving grease, a dispensing tube member 22 having an end portion 221 connected threadedly to the front end 211 of the barrel 21, and a piston 23 for pushing the grease toward the front end 211 of the barrel 21 in a known manner. The push rod member 33 is inserted radially and slidably into the end portion 221 of the dispensing tube member 22 through a hole 222 which is formed in the end portion 221 in order to push the grease out of the dispensing tube member 22 in a known manner when the push rod member 33 is moved reciprocally. The driving means 50 has a rotatable output shaft 501. The linkage means 30 interconnects the rotatable output shaft 501 of the driving means 50 and the push rod member 33 for converting rotary motion of the output shaft 501 into reciprocating motion of the push rod member 33, which will be described in greater detail hereinbelow. The connecting means 34 connects the driving means 50 and the gun body 20, which will be also described in detail hereinafter.

In the preferred embodiment, the linkage means 30 includes a housing 31, a pair of L-shaped guide rails 312, a bar member 35, a driven gear 321 and a speed reduction gear 323.

The housing 31 has a top wall 311, and front and rear walls 313, 315 which are both connected oppositely to the top wall 311. The top wall 311 is fixed to and is located under the end portion 221 of the dispensing tube member 22. The push rod member 33 passes through an opening 3111 in the top wall 311.

Each of the L-shaped guide rails 312 has a vertical arm 3121 and a horizontal arm 3122 which is connected to the internal face of the front wall 311 so that a sliding space 314 is formed between the vertical arm 3121 and the internal face of the front wall 311.

The bar member 35 is connected transversely to a lower end 331 of the push rod member 33 and has a transverse slot 351 formed lengthwise thereof. The bar member 35 is disposed slidably in the sliding spaces 314 formed by the guide rails 312 with the front wall 311 such that an upper end 332 of the push rod member 33 extends into the end portion 221 of the dispensing tube member 22.

The driven gear 321 is mounted rotatably to the internal face of the rear wall 315 by means of bearing 318 which is fixed in a bore 316 of the rear wall 315. The driven gear 321 has a central axle 322 which passes through the rear wall 315 and which is connected to the rotatable output shaft 501 of the driving means 50 so that the driven gear 321 can rotate with the rotatable output shaft 501 when the driving means 50 is actuated.

The speed reduction gear 323 is mounted rotatably to the internal face of the rear wall 315 by means of a bearing 319, a bolt 41 and a nut 42. To this end, the bolt 41 passes through the bearing 319, the speed reduction gear 323 and a hole 317 in the rear wall 315 and engages the nut 42. The speed reduction gear 323 meshes with the driven gear 321. The speed reduction gear 323 has an eccentric shaft 325 which extends into the transverse slot 351 of the bar member 35, as best illustrated in FIGS. 4 and 5.

Figure 4:
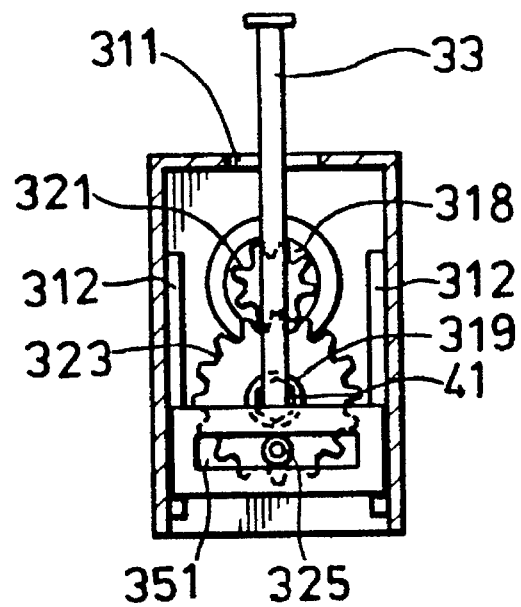
FIG. 4 is a schematic view showing how the bar member of the grease dispensing device engages the eccentric shaft of the linkage means according to the present invention.
Figure 5:
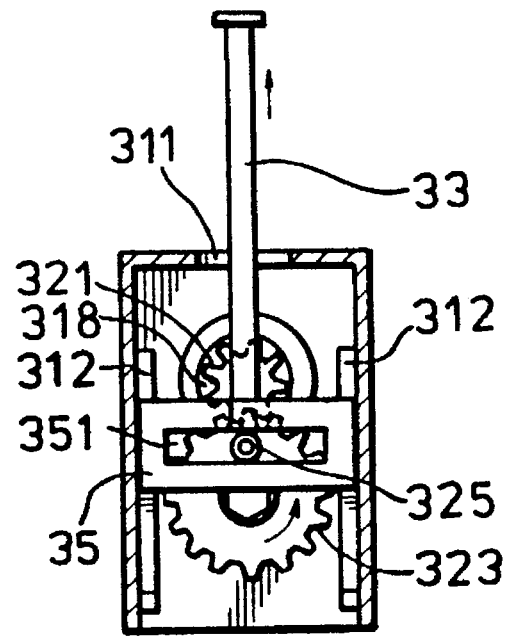
FIG. 5 is a schematic view showing how the bar member is moved to an uppermost position by the eccentric shaft of the linkage means according to the present invention.

When the driven gear 321 is rotated due to the rotation of the rotatable output shaft 501, the speed reduction gear 323 rotates to enable the eccentric shaft 325 to move reciprocally in the transverse slot 351 of the bar member 35 so that the bar member 35 can move up and down in the sliding spaces 314 between a lowermost position, as shown in FIG. 4, and an uppermost position, as shown in FIG. 5, thereby resulting in a reciprocating motion of the push rod member 33.

The connecting means 34 includes a first clamp member which has two rings 341, 343 and a rod member 342 interconnecting the two rings 3341, 343 at its two ends. The two rings 341, 343 are fixed around the barrel 21 of the gun body 20. The connecting means 34 further has a second clamp member 345 in the form of a ring which is clamped onto the driving means 50 and one of the rings 343 of the first clamp member by means of a bolt 43 and a nut 44, as best illustrated in FIG. 2.

Since the push rod member 33 can be driven by a electrical driving means 50 according to the present invention, the grease in the gun body 20 can be applied to a large-scale machine which requires many grease injection operations in a time-saving and labor-saving manner.

A handle 52 can be fixed to the lower end of the housing 31 in order to facilitate handling of the grease dispensing device when in use.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangement.

We claim:

1. A grease dispensing device, comprising:

a gun body having a barrel for receiving grease, and a grease dispensing tube member with an end portion connected to said barrel;

a push rod member inserted radially and slidably into said end portion of said dispensing tube member in order to push said grease out of said dispensing tube member when said push rod member is moved reciprocally;

driving means having a rotatable output shaft;

linkage means interconnecting said rotatable output shaft and said push rod member for converting rotary motion of said output shaft into reciprocating motion of said push rod member;

means for connecting said driving means to said gun body;

said linkage means comprising:

a housing having a top wall, front and rear walls connected oppositely to said top wall, said top wall being fixed to and being located under said end portion of said dispensing tube member, said push rod member extending through and top wall;

a pair of L-shaped guide rails, each having a vertical arm and a horizontal arm which is connected to an internal face of said front wall so that a sliding space is formed between each said vertical arm and said internal face of said front wall;

a bar member connected transversely to a lower end of said push rod member and having a transverse slot formed lengthwise thereof, said bar member being disposed slidably in said sliding spaces formed by said guide rails and said front walls such that an upper end of said push rod member extends into said end portion of said dispensing tube member;

a driven gear mounted rotatably to an internal face of said rear wall and having an axle which passes through said rear wall and which is connected to said rotatable output shaft of said driving means so that said driven gear can rotate with said rotatable output shaft when said driving means is actuated; and a speed reduction gear rotatably mounted to said internal face of said rear wall, said speed reduction gear meshing with said driven gear and having an eccentric shaft which extends into said transverse slot of said bar member, whereby when said driven gear is rotated, said speed reduction gear rotates to enable said eccentric shaft to move reciprocally in said transverse slot of said bar member so that said bar member can move up and down in said sliding spaces, thereby resulting in a reciprocating motion of said push rod member.

2. A grease dispensing device as claimed in claim 1, wherein said connecting means includes a first clamp member which is connected to said barrel of said gun body and a second clamp member which is connected to said first clamp member and said driving means.

* * * * *

UNITED STATES PATENT AND TRADEMARK OFFICE
CERTIFICATE OF CORRECTION

PATENT NO.   :   5,609,274
DATED        :   March 11, 1997
INVENTOR(S)  :   H. SHIH et al.

It is certified that error appears in the above-indentified patent and that said Letters Patent is hereby corrected as shown below:

At column 4, line 65 (claim 2, line 5), change "and-said" to ---and said---.

Signed and Sealed this

Seventeenth Day of June, 1997

Attest:

BRUCE LEHMAN

*Attesting Officer*   *Commissioner of Patents and Trademarks*